(12) United States Patent
Hoferer et al.

(10) Patent No.: US 9,086,310 B2
(45) Date of Patent: Jul. 21, 2015

(54) TRACKING WITH CONSIDERATION OF MOBILITY

(75) Inventors: Christian Hoferer, Offenburg (DE); Roland Welle, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 512 days.

(21) Appl. No.: 13/552,189

(22) Filed: Jul. 18, 2012

(65) Prior Publication Data

US 2013/0035880 A1 Feb. 7, 2013

Related U.S. Application Data

(60) Provisional application No. 61/515,184, filed on Aug. 4, 2011.

(30) Foreign Application Priority Data

Aug. 4, 2011 (EP) ..................................... 11176609

(51) Int. Cl.
| | | |
|---|---|---|
| G01F 23/284 | (2006.01) | |
| G06F 19/00 | (2011.01) | |
| G01F 23/296 | (2006.01) | |
| G01F 23/28 | (2006.01) | |
| G01S 7/41 | (2006.01) | |
| G01S 13/70 | (2006.01) | |
| G01S 13/88 | (2006.01) | |

(52) U.S. Cl.
CPC .................. *G01F 23/28* (2013.01); *G01S 7/415* (2013.01); *G01S 13/70* (2013.01); *G01S 13/88* (2013.01)

(58) Field of Classification Search
CPC ......... G01F 23/28; G01S 13/70; G01S 7/415; G01S 3/88

USPC ................. 702/55, 75, 166; 73/290 V, 304 R; 342/124; 367/99

See application file for complete search history.

(56) References Cited

U.S. PATENT DOCUMENTS

| | | | | |
|---|---|---|---|---|
| 4,992,998 | A * | 2/1991 | Woodward ...................... | 367/99 |
| 5,157,639 | A * | 10/1992 | Leszczynski ................... | 367/99 |
| 5,973,637 | A * | 10/1999 | Perdue et al. ................. | 342/124 |
| 6,504,793 | B2 * | 1/2003 | Fuenfgeld ........................ | 367/99 |
| 6,634,228 | B2 * | 10/2003 | Deserno et al. ............. | 73/290 V |
| 6,684,919 | B2 * | 2/2004 | Gaiser ............................. | 141/95 |
| 6,759,976 | B1 * | 7/2004 | Edvardsson .................. | 342/124 |
| 6,922,150 | B2 * | 7/2005 | Håll et al. ...................... | 340/612 |
| 7,284,425 | B2 * | 10/2007 | Wennerberg et al. ........ | 73/290 V |
| 7,355,548 | B2 * | 4/2008 | Larsson et al. ................ | 342/124 |
| 7,467,548 | B2 * | 12/2008 | Fredriksson ............... | 73/304 R |
| 2004/0036617 | A1 * | 2/2004 | Hall et al. ...................... | 340/612 |

(Continued)

FOREIGN PATENT DOCUMENTS

| | | |
|---|---|---|
| DE | 33 37 690 | 4/1985 |
| DE | 42 34 300 | 4/1994 |

(Continued)

*Primary Examiner* — Carol S Tsai
(74) *Attorney, Agent, or Firm* — Fay Kaplun & Marcin, LLP

(57) ABSTRACT

A level gauge carries out a tracking method with consideration of the mobility of the echoes. For this purpose, mobility values of echoes of an echo curve are determined and the expectancy function, by means of which it is determined whether a certain echo needs to be assigned to a certain track, is determined with consideration of at least one of the mobility values. In this way, the correct allocation of an echo to a certain track may be realized with high reliability.

12 Claims, 10 Drawing Sheets

(56) References Cited

U.S. PATENT DOCUMENTS

| | | | |
|---|---|---|---|
| 2004/0257269 A1* | 12/2004 | Laun | 342/124 |
| 2005/0044952 A1 | 3/2005 | Schroth et al. | |
| 2005/0052314 A1* | 3/2005 | Spanke et al. | 342/124 |
| 2006/0052954 A1* | 3/2006 | Welle et al. | 702/55 |
| 2006/0137446 A1* | 6/2006 | Wennerberg et al. | 73/290 V |
| 2009/0299662 A1* | 12/2009 | Fehrenbach et al. | 702/55 |
| 2010/0019949 A1 | 1/2010 | Larocque et al. | |
| 2010/0223019 A1* | 9/2010 | Griessbaum et al. | 702/75 |
| 2012/0035867 A1 | 2/2012 | Welle et al. | |

FOREIGN PATENT DOCUMENTS

| | | |
|---|---|---|
| DE | 10 2004 052 110 | 5/2006 |
| EP | 1 489 393 | 12/2004 |
| EP | 1 628 119 | 2/2006 |
| EP | 2 148 219 | 1/2010 |
| EP | 2 366 983 | 9/2011 |
| JP | 11064072 A * | 3/1999 |
| WO | 2004/010093 | 1/2004 |
| WO | 2009/003700 | 1/2009 |

* cited by examiner

TRACKING WITH CONSIDERATION OF MOBILITY

REFERENCE TO RELATED APPLICATIONS

This application claims the benefit of the filing date of EP Patent Application Serial No. EP 11 176 609.3 filed 4 Aug. 2011 and U.S. Provisional Patent Application Ser. No. 61/515,184 filed 4 Aug. 2011, the disclosure of both applications is hereby incorporated by reference.

FIELD OF THE INVENTION

The invention pertains to level measurements. The invention specifically pertains to a level gauge, i.e., a filling level measuring device, for determining mobility values of echoes of an echo curve and for carrying out a tracking method with consideration of at least one of the mobility values, the utilization of such a level gauge for interfacial level measurements, a method, a program element and a machine-readable medium.

TECHNICAL BACKGROUND

In level sensors that operate in accordance with the FMCW (Frequency Modulated Continuous Wave) or the pulse-time delay principle, electromagnetic or acoustic waves are emitted in the direction of a product surface. Subsequently, a sensor records the echo signals reflected by the product, i.e., the filling medium, the container fixtures and the container itself and derives the location or position of a surface of at least one product situated in the container from the recorded echo signals.

When using acoustic or optical waves, the signal generated by the level gauge generally propagates freely in the direction of the product surface to be measured. In devices that utilize radar waves for measuring the product surface, the radar waves may either propagate freely in the direction of the medium to be measured or in the interior of a hollow waveguide that guides the radar waves from the level gauge to the medium. In devices that operate in accordance with the guided microwave principle, the high-frequency signals are guided to the medium along a waveguide.

The arriving signals are reflected on the surface of the medium or product to be measured and once again arrive at the level gauge after a corresponding transit time. The level gauge receives the signals reflected at different locations and determines the distance to the product thereof The determined distance to the product is transmitted to an external location. The transmission may be realized in analog form, for example, by means of a 4 . . . 20 mA interface or in digital form, for example, by means of a fieldbus protocol.

A tracking method may be utilized in order to group echoes of successive echo curves that result from identical reflection points respectively. However, it may be difficult to correctly allocate an echo to a certain track.

SUMMARY OF THE INVENTION

It may be desirabel to simplify the correct allocation of an echo to a track.

A level gauge, use or a utilization, a method, a program element and a machine-readable medium according to the characteristics of the independent claims are disclosed. Enhancements of the invention result from the dependent claims and the following description.

According to a first aspect of the invention, a level gauge for determining mobility values of echoes of an echo curve and for carrying out a tracking method with consideration of at least one of the mobility values is disclosed. The level gauge features an arithmetic unit, i.e., a calculation unit or processor, that comprises, for example, one or more microprocessors and is designed for determining a first mobility value of a first echo of a first echo curve with consideration of a positional shift of the first echo and a positional shift of another echo of the first echo curve. The arithmetic unit is furthermore suitable for carrying out a tracking method in order to group echoes of successive echo curves that result from identical reflection points.

The arithmetic unit is furthermore designed for allocating a second echo of a second echo curve that is acquired after the first echo curve to a certain track with consideration of at least the first mobility value.

In other words, the level gauge is able to carry out a modified tracking method, in which it can be taken into consideration whether a certain echo has moved in the past (for example, during an earlier measurement or between the earlier measurement and a measurement that took place prior to this earlier measurement) and furthermore whether another echo has also moved.

When allocating a certain echo (of a currently measured echo curve) to a certain track, it is in other words possible to take into consideration information on whether the echo of this track has moved during the preceding measurement or during the preceding measurements. It is furthermore taken into consideration whether another echo has moved during the preceding measurement or during the preceding measurements. Consequently, two movements or positional shifts of two echoes are interrelated and this relation is incorporated into the decision whether an echo of a newly recorded echo curve needs to be allocated to a certain track or not.

According to another aspect of the invention, the mobility value of an echo is a parameter for the absolute movement or the relative movement of the echo that is determined with consideration of simultaneously occurring movement or movements or positional shifts or another change (for example, a widening, narrowing, amplitude increase or amplitude decrease) of at least one other echo.

The positional shift of an echo of an echo curve refers, for example, to the movement of an echo, for example, during the acquisition of the echo curve. This movement may be detected, for example, with the aid of a Doppler evaluation of the echo curve. In addition, this movement can also be calculated by means of differentiation in that the positions of the echo or echoes of identical reflection origin are compared with one another in two or more successive echo curves.

According to another aspect of the invention, the allocation of the second echo to the certain track is carried out by utilizing an expectancy function, by means of which a probability for the correct allocation of the second echo to the certain track can be calculated. The width or the variance of the expectancy function is reduced if the positional shift of the first echo of the first echo curve is zero or insignificant, but the positional shift of the other echo of the first echo curve is not equal to zero or significantly greater than the positional shift of the first echo.

Consequently, the width or the variance of the expectancy function for a second echo to be allocated to a track can be reduced if a first echo of a first echo curve did not move during a preceding measurement, but at least one other echo of the first echo curve did move.

Consequently, if this first echo does not move over several measuring cycles, but a movement of other echoes indeed takes place, the width of the expectancy function for the track allocated to this stationary first echo becomes smaller and smaller.

According to another aspect of the invention, the expectancy function is a window function, i.e., a rectangular function.

However, the expectancy function may, for example, also be a Gauss-like function.

According to another aspect of the invention, the width or the variance of the expectancy function is increased if the positional shift of the first echo of the first echo curve is not equal to zero or deviates from zero by a certain amount.

According to another aspect of the invention, the width or the variance of the expectancy function is increased if the second echo falls short of a minimum distance to an adjacent echo of the second echo curve.

If the second echo approaches an adjacent echo (or vice versa), the width or variance of the expectancy function consequently can be increased more significantly than in instances, in which the distance to an adjacent echo does not fall short of a minimum distance.

According to another aspect of the invention, the width or the variance of the expectancy function can be increased if the expectancy function overlaps with a corresponding expectancy function of the adjacent echo.

According to another aspect of the invention, the mobility value of the first echo is reduced if the first echo did not move in the preceding measurement, but at least one other echo did move. In other words, the mobility value is reduced if the positional shift of the first echo of the first echo curve is zero, but the positional shift of the other echo of the first echo curve is not equal to zero.

It is therefore possible to lower the corresponding mobility value, as well as the width or variance of the expectancy function. In other words, stationary echoes are "penalized twice."

According to another aspect of the invention, the initial expectancy functions have an identical width or variance. In other words, the expectancy functions that are allocated to the echoes and/or the tracks of an initial echo curve acquired at the beginning of the tracking method and by means of which it is determined whether an echo of a subsequently acquired echo curve needs to be allocated to a certain track have an identical width or variance.

The tracking method then begins and the widths or variances of the expectancy functions can be correspondingly reduced or increased depending on how the echoes (and therefore the tracks) behave in relation to one another.

According to another aspect of the invention, the utilization of a level gauge of the type described above and below for interfacial level measurements is disclosed.

According to another aspect of the invention, a method for determining mobility values of echoes of an echo curve and for carrying out a tracking method with consideration of at least one of the mobility values is disclosed. In this method, the first mobility value of a first echo of a first echo curve is initially determined with consideration of a positional shift of the first echo and a positional shift of another echo of the first echo curve. Subsequently, a tracking method is carried out in order to group echoes of successive echo curves that result from identical reflection points. A second echo of a second echo curve acquired after the first echo curve is allocated to a certain track with consideration of at least the first mobility value.

In addition, the method may also be used for determining the position of an interfacial layer and, in particular, featuring the following steps:

Receiving an echo curve; determining at least two different echoes in the echo curve; determining a mobility value of at least one echo of the echo curve, wherein at least one parameter of a positional shift of this echo and at least one parameter of a positional shift of another echo are used for this purpose; carrying out a tracking method in order to group echoes of identical reflection points over several measuring cycles, wherein at least one mobility value of an echo or track acquired in prior measuring cycles is used for this purpose.

According to another aspect of the invention, a machine-readable medium is disclosed, on which a program element is stored that, when executed on a processor of a level gauge, prompts the processor to carry out the procedural steps described above and below.

In this case, the program element may, e.g., form part of software that is stored on a processor of the level gauge. The processor may likewise form an object of the invention in this case. This exemplary embodiment of the invention furthermore comprises a computer program element that already utilizes the invention from the beginning, as well as a computer program element that prompts an existing program to utilize the invention due to an update (update).

The method may make it possible to implement robust tracking, particularly under changing amplitude conditions and in the presence of spurious echoes in a container.

Exemplary embodiments of the invention are described below with reference to the figures.

DETAILED DESCRIPTION

Figure 1:
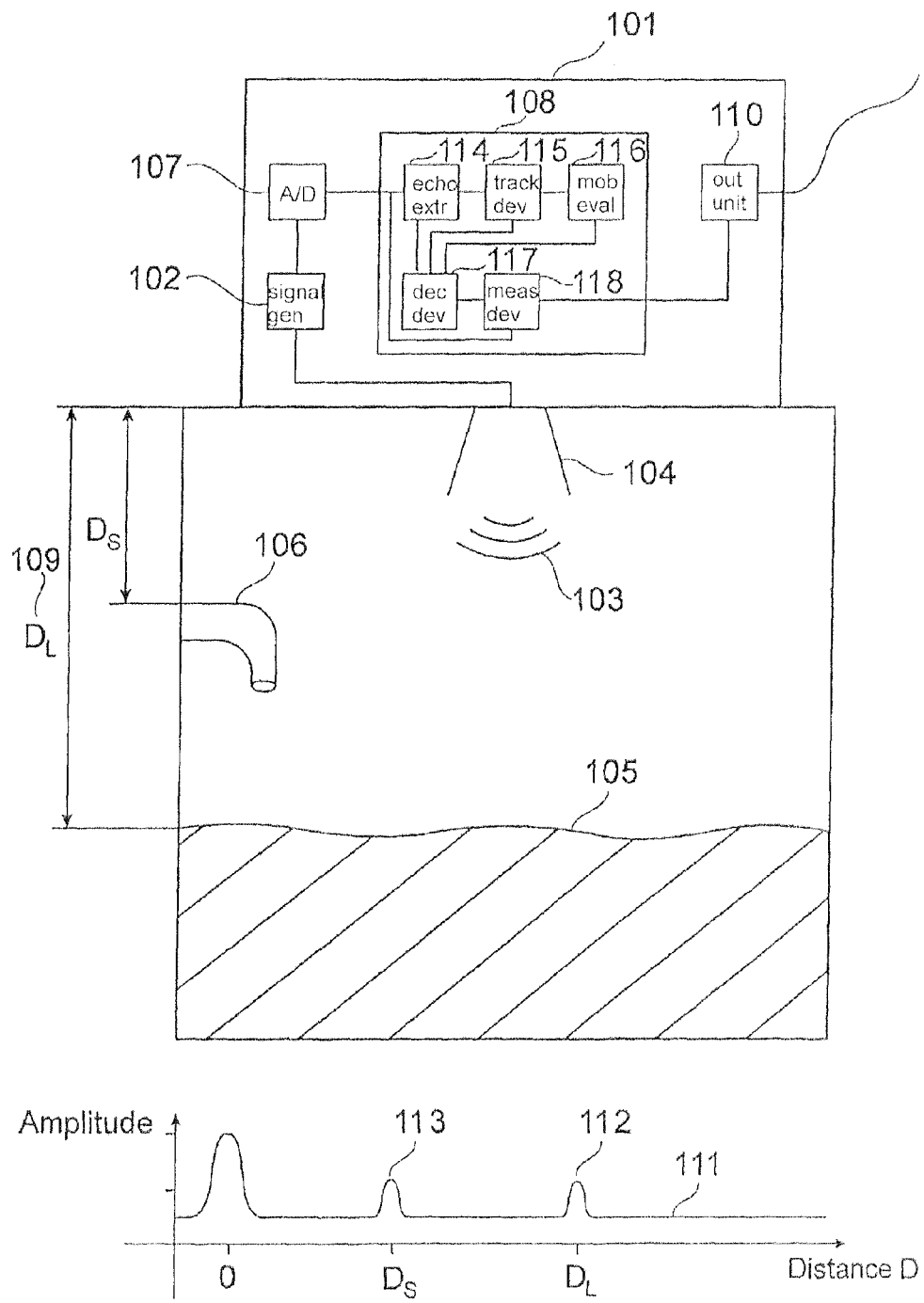
FIG. 1 shows a device for determining the position of a product surface in a container.

The figures show schematic representations that are not true-to-scale.

In the following description of the figures, identical or similar elements in the different figures are identified by the same reference numerals. However, identical or similar elements may also be identified by different reference numerals.

FIG. 1 shows a typical application of a commercially available level gauge.

The level gauge 101 generates a measuring signal 103 with the aid of a signal generating unit 102 and emits this measuring signal in the direction of the medium 105 to be measured via a suitable transmitting/receiving device 104 or an antenna 104. The level gauge itself can determine the distance from the medium in accordance with the ultrasound, radar, laser or guided microwave principle. Accordingly, ultrasonic waves as well as electromagnetic waves may be considered as measuring signals 103.

The medium 105 reflects the incident measuring signal back to the level gauge where it is received and processed. However, the emitted signal is simultaneously reflected by container fixtures such as, for example, a feed pipe 106.

The measuring signals received via the antenna 104 are transformed into a lower-frequency intermediate frequency range, for example, with the aid of the signal generating unit 102 and subsequently forwarded to an analog/digital converter unit 107. The analog/digital converter unit 107 digitizes the received echo curve and makes the scanned amplitude values available to an echo signal processing unit 108.

The echo signal processing unit 108 analyzes the delivered echo curve and determines the distance $D_L$ 109 between the level gauge and the surface of the medium 105 to be measured by utilizing predefined methods. The determined distance $D_L$ 109 is forwarded to an output unit 110. The determined distance value is further processed within this output unit in accordance with user specifications, for example, in the form of offsetting or by taking into consideration linearization functions for compensating non-linear container geometries.

A core component of each level gauge is the echo signal processing unit 108 that determines the distance to the product surface 105 based on a digitized echo curve 111.

The echo curve 111 delivered to the echo signal processing unit 108 for this purpose may not only feature the useful echo 112 or product echo 112 caused by the product surface 105, but also echoes of permanently installed interference points 106 that are referred to as spurious echoes 113 below. The presence of such spurious echoes complicates the determination of the distance to the product surface and is the reason why complex methods have established themselves for the evaluation of an echo curve. The devices required for carrying out such a method are also illustrated in FIG. 1.

In a first procedural step, the echo curve 111 delivered by the analog/digital converter unit is examined with respect to echoes within the echo signal processing unit 108. For this purpose, the echo signal processing unit features an echo extraction device 114 or echo determination device 114. The methods applied in this processing block include, in particular, methods from the field of threshold-based echo extraction or even methods on the basis of scale-based echo extraction. After the completion of the echo extraction method, a digital echo list is made available that preferably includes information on the beginning, location and end of one or more echoes contained in the echo curve.

In order to further improve the echo signal processing reliability of a level gauge, the detected echoes are put in historical context within a tracking device 115. The methods used in this case may originate from the current state of the art. For example, methods on the basis of the Munkres algorithm can be advantageously applied. Within this tracking process, in particular, the course of the location of an echo is tracked over several individual measurements and the gathered information is represented in the memory in the form of a track. The gathered historical information of several echoes is transmitted to an external location in the form of one or more track lists.

The reliability of identifying the product reflection can be significantly improved by evaluating the mobility of individual echoes. During the course of a mobility calculation, it is in the present instance determined that the product echo 112 varies with respect to the echo location (also referred to as echo position) over several measurements while the echo 113 of the reflection on the feed pipe 106 does not vary with respect to the echo location. The mobility evaluation device 116 makes the mobility values available to an external location.

The results of the echo extraction device 114, the tracking device 115 and the mobility evaluation device 116 are merged in a decision device 117. Based on the delivered data, the decision device determines the echo of the current echo curve that was produced by the product surface in accordance with conventional methods.

The data of the identified product echo is delivered to a measuring device 118 that has the function of further improving the accuracy of the level measurement. Conventional methods such as, for example, methods from the field of echo curve interpolation or echo curve approximation are used for this purpose.

Procedural (i.e. method) steps that are carried out within the scope of the present invention are described in greater detail below with reference to the figures.

Figure 3:
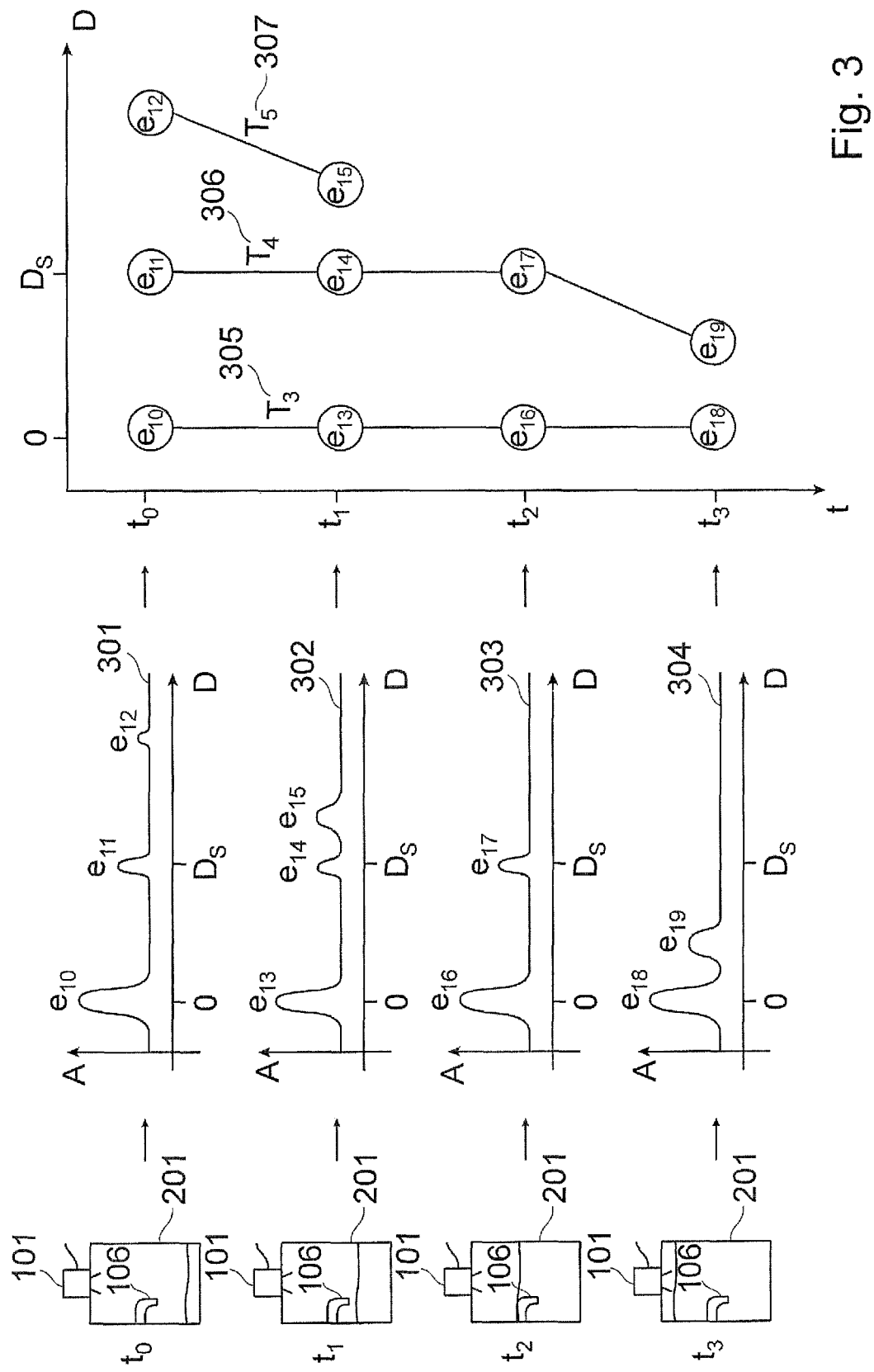
FIG. 3 shows an echo signal evaluation for a low DK value by utilizing a tracking method.

A sequence of received echo curves of the type illustrated in FIG. 3 is obtained if cyclic measuring cycles are implemented in a level gauge. In this example, four independent measuring cycles are illustrated within respective time intervals of 5 minutes. It would naturally also be possible to realize significantly faster measuring cycles, for example, within time intervals of 1 second.

The illustrated scenario shows the conditions during the filling of a container 201. A measuring cycle of the level gauge 101 is initiated at each of the times t0, t1, t2 and t3. After the reception of the respective echo curve 202, 203, 204, 205, it is examined with respect to echoes by means of conventional methods. In order to track the course of the location or position of the individual echoes over several measuring cycles of this type, tracking of the detected echoes is carried out during the further course of the method.

In the present example, the course of the location of the echoes e0, e3, e6 and e8 that are caused by the antenna 104 itself is described by a common track T0. In addition, the course of the location of the echoes e1 and e4 caused by the feed pipe 106 is described by a corresponding track T1. The course of the echoes caused by the product 105 over several measuring cycles is described by the track T2 that consists of the echoes e2, e5, e7 and e9.

During the execution of a tracking algorithm, the tracks T0 and T2 are initialized at the time t0 and progressively expanded at the times t1, t2 and t3. Furthermore, the track T1 is initialized at the time t0 and expanded during the signal processing procedure at the time t1.

The illustration of the course of echoes that are caused by a common reflection point is described in the form of a track in the relevant literature and also beneficially utilized in other fields such as, for example, in air surveillance.

The allocation of the currently acquired echoes of an echo curve to the tracks that were already acquired in earlier measuring cycles is essentially achieved in that the difference with respect to the location and the amplitude of the track and the respective echo is determined and echoes are only allocated to tracks if they approximately have the same amplitude and position as the last known corresponding parameters of the tracks.

Figure 2:
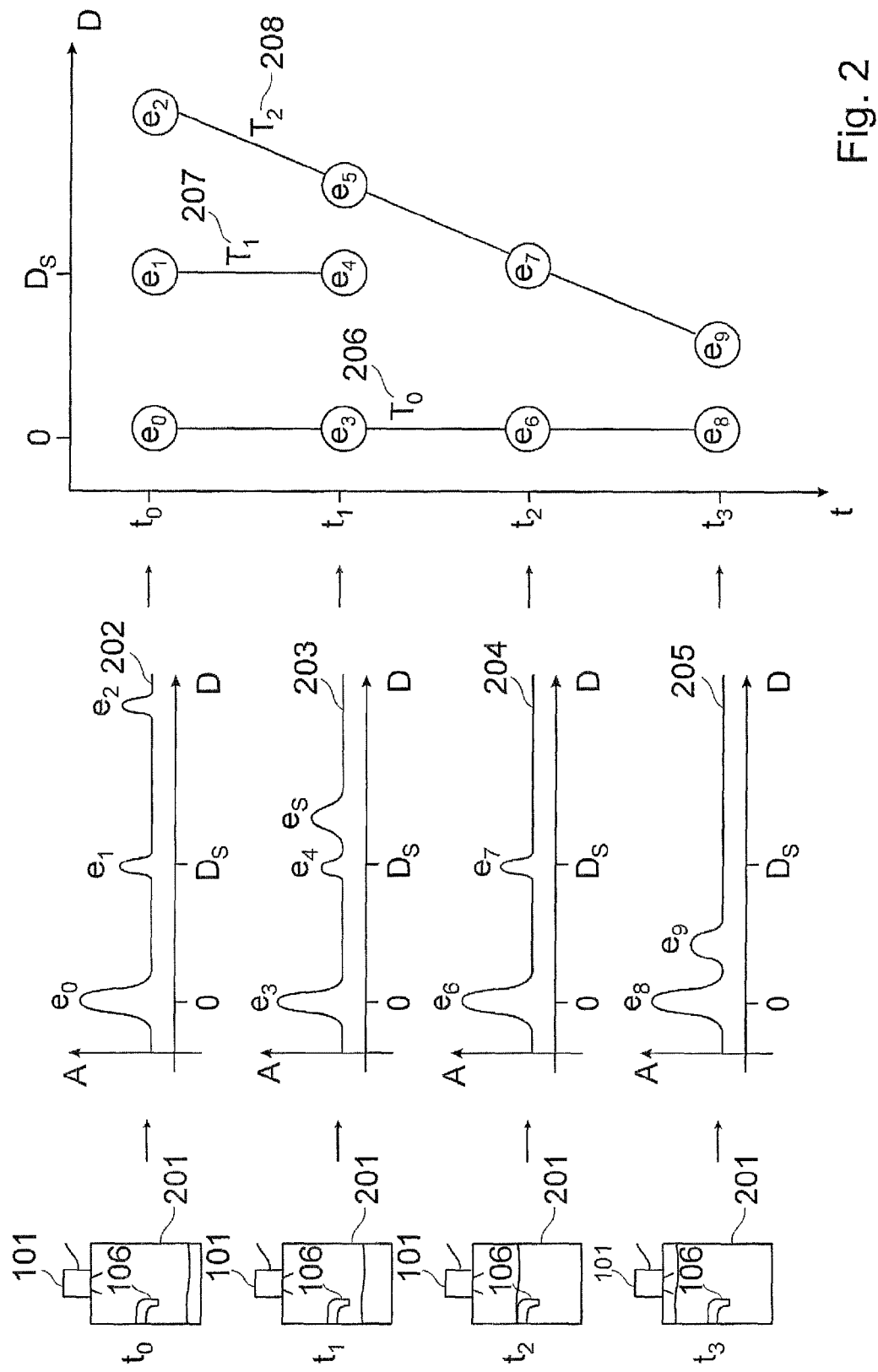
FIG. 2 shows an echo signal evaluation by utilizing a tracking method.

FIG. 3 shows the conditions during the filling of the same container with a liquid that, in contrast to the example according to FIG. 2, has a significantly lower DK value and therefore a significantly lower reflectivity. The DK value describes the dielectric constant of a medium and is also referred to as permittivity. The echo curves 301, 302, 303 and 304 acquired at the times t0 to t3 primarily differ from the corresponding echo curves according to FIG. 2 in that the echoes e12, e15, e17 and e19 of the product reflection have a lower amplitude.

The illustration of the second curve 302 clearly shows that the echo e15 of the product surface nearly has the same amplitude as the echo e14 of the feed pipe 106. Due to this constellation, a tracking method that is carried out conventionally encounters problems with the allocation of the echoes of identical reflection points to pre-existing tracks. According to the above-outlined steps, a conventional tracking device 115 needs to decide at the time t=t2 whether the echo e17 identified in the curve 303 should be allocated to the pre-existing track T3 305, T4 306 or T5 307. Due to the significant difference in location between the track T3 and the echo e17, it quickly becomes clear during the execution of conventional tracking methods that the echo can only be allocated to track T4 or track T5. In the relevant technical literature, this "pre-selection" step is also referred to as "gating." Since the current amplitude values of the echo e14 (track T4) and the echo e15 (track T5) are nearly identical, the decision as to which track the echo e17 should be allocated can in the present case only be made based on the smallest difference in location between the echo and the respective track. Consequently, the echo e17 and subsequently also the echo e19 are erroneously allocated to track T4.

However, since the echoes e17 and e19 were caused by the product surface and the track T4 should group the echoes of the feed pipe 106, a classic misallocation has occurred which massively complicates the further evaluation steps that are based on the track list.

Figure 4:
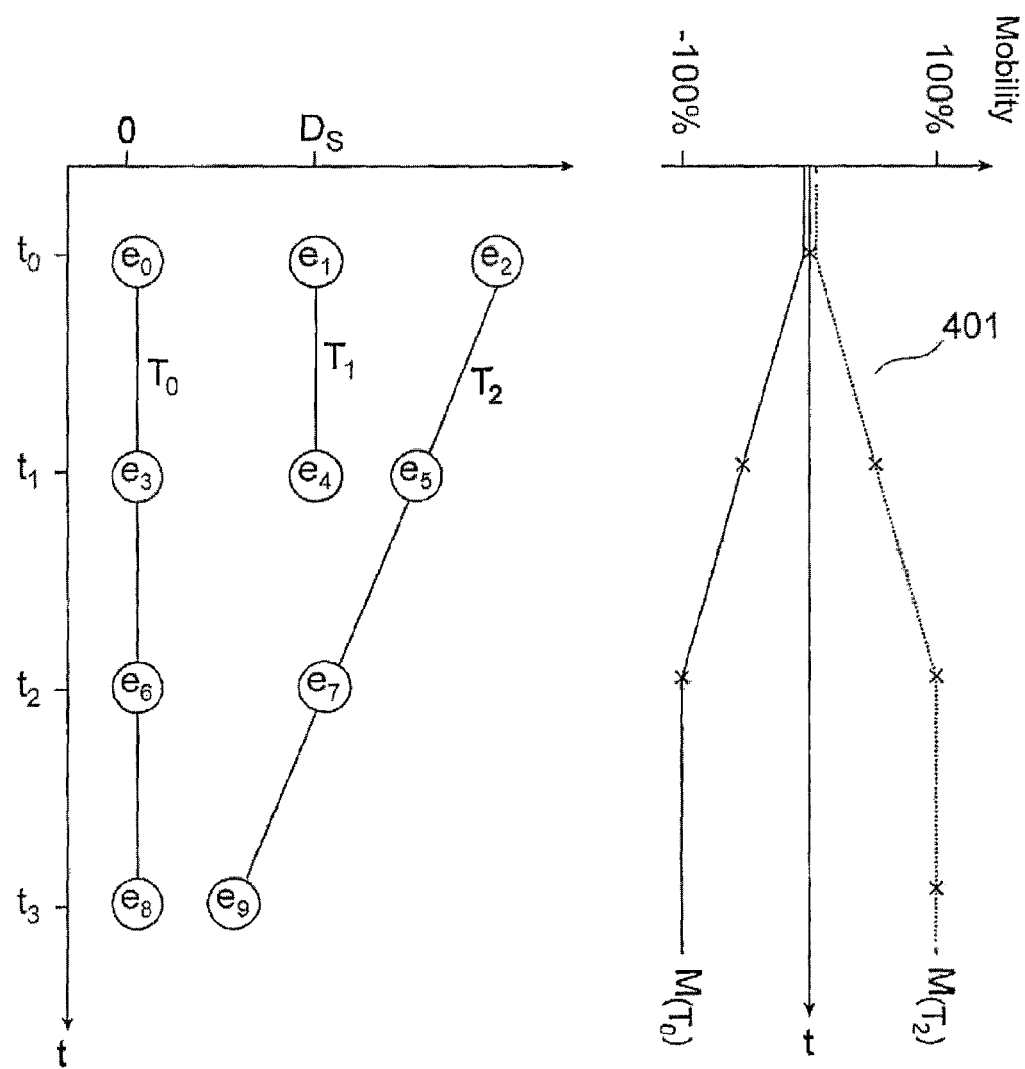
FIG. 4 shows an echo signal evaluation with determination of mobility values.

FIG. 4 shows an important step during the evaluation of the tracks of a track list. According to conventional methods, the tracks can be examined with respect to their mobility. Disclosures in this respect can be found, for example, in EP 10 156 793.1. In contrast to a classic motion analysis that merely provides information on which track and/or which echo moves, the mobility analysis also makes it possible to obtain information on which track has a proven stationarity. The illustration according to FIG. 4 elucidates this context with the aid of the track list of FIG. 2.

The tracks T0, T1 and T2 are initialized at the time t=t0. Since all of these tracks only feature a single echo and no Doppler evaluation should be carried out in the present instance, no information whatsoever on the mobility of the tracks is available at the corresponding time. Consequently, the illustration of the mobility values 401 at the time t=t0 shows a mobility of 0% for all tracks. It should be noted that the mobility of the track T1 is not illustrated in the figure in order to provide a better overview. At the time t=t1, the mobility evaluation device 116 detects that the track T2 has moved in the time period between t0 and t1 while the track T0 did not move at all during the same time period. In other words, the mobility evaluation device (116) determines after the completion of the level gauge measuring cycle initiated at the time t=t1 that the echo e3 of the track T0 has a positional shift or movement of zero or nearly zero while the echo e5 of the track T2 has a positional shift or movement greater than zero. Consequently, the mobility M(T2) is increased while the mobility M(T0) is decreased. The corresponding sampling points in the mobility diagram (401) elucidate at the time t=t1 that the track T2 positively moves (mobility>0) while the track T=T0 has a proven stationarity (mobility<0). In other words, the track T0 (and therefore the echo e3 allocated thereto) positively does not move because another movement was detected while it remained at its location. At the times t=t2 and t=t3, the obtained information is reinforced in accordance with the aforementioned diagram. It therefore becomes clear that the mobility analysis can be disadvantageously influenced with respect to its efficiency by an erroneous track list according to the example illustrated in FIG. 3.

FIG. 5 once again elucidates the pre-selection of potential successive echoes of a track that takes place in the tracking device 115 and is also referred to as gating. A track gate or gate defines a positional range, in which potential successive echoes of a track must lie. In the practical implementation, information on the respective application is incorporated into the definition of the width of a gate in the first place. For example, it can be specified that a level change can have a maximum filling or emptying speed of 0.1 m per second. In connection with a typical measurement repetition frequency of 1 second between two level gauge measuring cycles, it can be concluded that a potential successive echo of a track needs to lie in a range of +−10 cm around the previously registered location of the track. All echoes that lie at a greater distance from the track can no longer be considered as successor for causal reasons.

Figure 5:
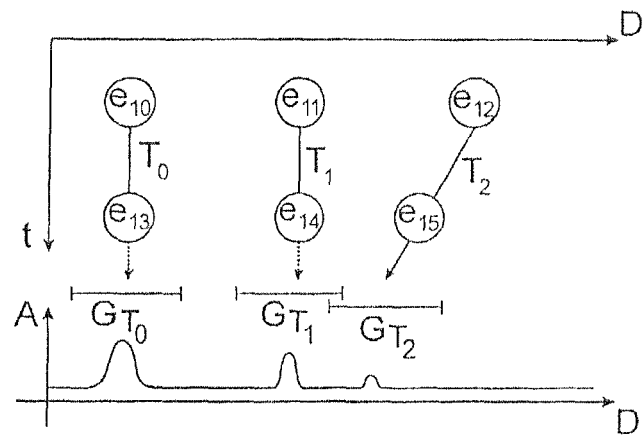
FIG. 5 shows tracking, in which a gating method is carried out.

FIG. 5 shows an example of a tracking situation, in which gates GT0, GT1, GT2 of the tracks T0, T1, T2 are also illustrated. It becomes clear that the determination of potential successors of a track can be significantly accelerated. It furthermore becomes clear that a misallocation—as illustrated in FIG. 3—cannot be prevented with conventional gating because the respective gates overlap when two tracks converge and it consequently depends on the amplitude conditions whether or not a correct allocation of echoes to tracks can be realized.

The invention makes available a robust method for tracking different echoes. The present invention particularly improves conventional tracking algorithms when two different tracks intersect.

Figure 6:
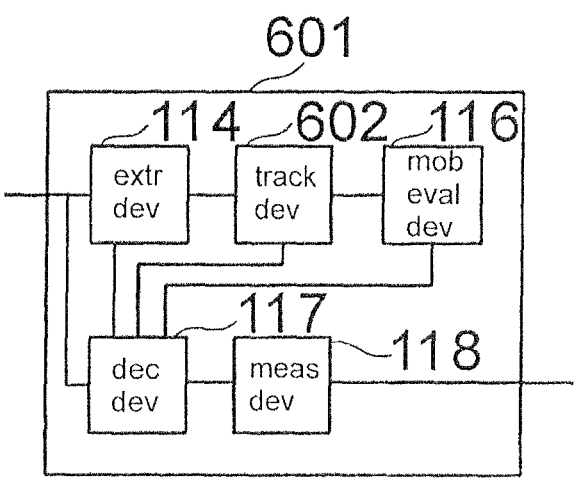
FIG. 6 shows a device for determining the position of a product surface according to an exemplary embodiment of the invention.

FIG. 6 shows an echo signal processing unit 601 that was modified in accordance with the invention and can be distinguished from units 108 known so far by a modified tracking device 602.

Figure 7:
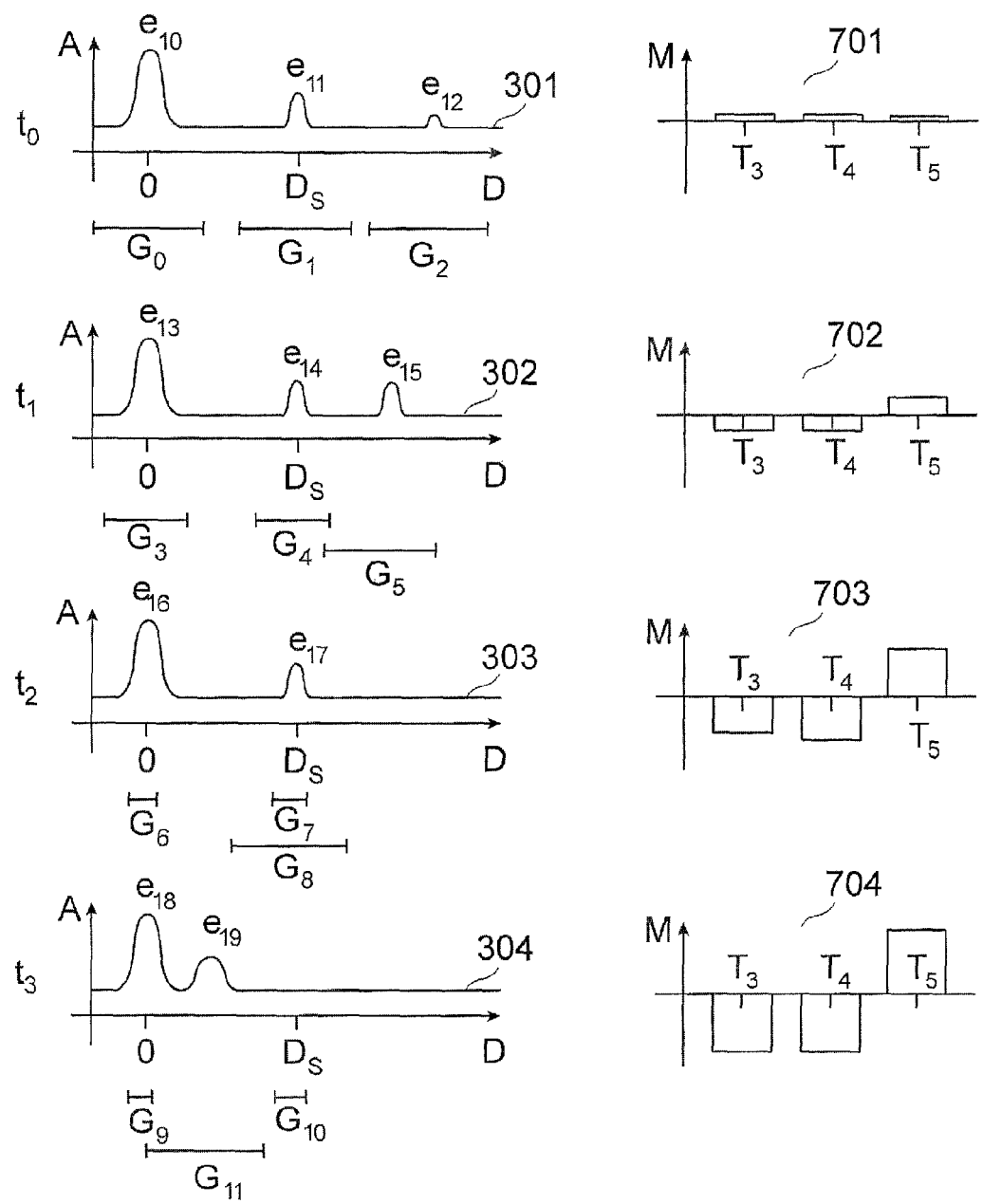
FIG. 7 shows an echo signal evaluation method according to an exemplary embodiment of the invention.

FIG. 7 shows the course of a signal processing procedure with a modified signal processing unit 601. This illustration shows the echo curve sequence 301, 302, 303, 304 that is already known from FIG. 3 and results in mediums with inferior DK value. Furthermore, the mobility values determined for the tracks T3 (305), T4 (306) and T5 (307) in FIG. 3 are illustrated at the times t0, t1, t2 and t3. At the time t=t0, the track T3 (305) is initialized by utilizing the echo e10. Furthermore, the tracks T4 (306) and T5 (307) are newly initialized with the echoes e11 and e12. The mobility evaluation device 116 initializes the mobility values of the three tracks at 0 (701) such that no information at all on stationary behavior or movement is available. At this time, an inventive tracking device furthermore defines the gates G0, G1 and G2 as expectancy ranges for the continuation of the tracks.

Another echo curve 302 is acquired at the time t=t1. The tracks T3, T4 and T5 are continued with the echoes e13, e14 and e15. Furthermore, initial information on the mobility of the tracks is available at this time. The corresponding mobility diagram 702 shows that the tracks T3 and T4 clearly have a stationary behavior while the track T5 moves. In other words, the echoes of the tracks T3, T4 or also the tracks T3, T4 have negative mobility values while the echoes of the track T5 or the track T5 have a positive mobility value. The inventive tracking device now calculates the width of the new gates G3, G4 and G5 by utilizing the mobility values of the tracks. In the present exemplary embodiment, only the negative mobility is evaluated such that the width of the gates G3 and G4 is reduced in comparison with the width of the gates G0 and G1. It would also be possible to utilize the positive mobility in order to widen gates.

At the time t=t2, another echo curve is received, the echoes e16 and e17 of which may be used for continuing T3 and T4 in accordance with the illustration in FIG. 3. According to the mobility diagram 703, the tracks T3 and T4 have a further increasing negative mobility such that the width of the corresponding gates G6 and G7 needs to be further reduced in accordance with the invention. In contrast, the width of the gate G8 belonging to the track 5 remains at the originally specified value.

At this point, it already becomes clear that the gate G8 of the track T5 covers a much larger range than the gate G7 of the track T4. The present measure makes it possible to effectively prevent an "off-allocation" of stationary tracks to echoes with greater difference in position.

Figure 8:
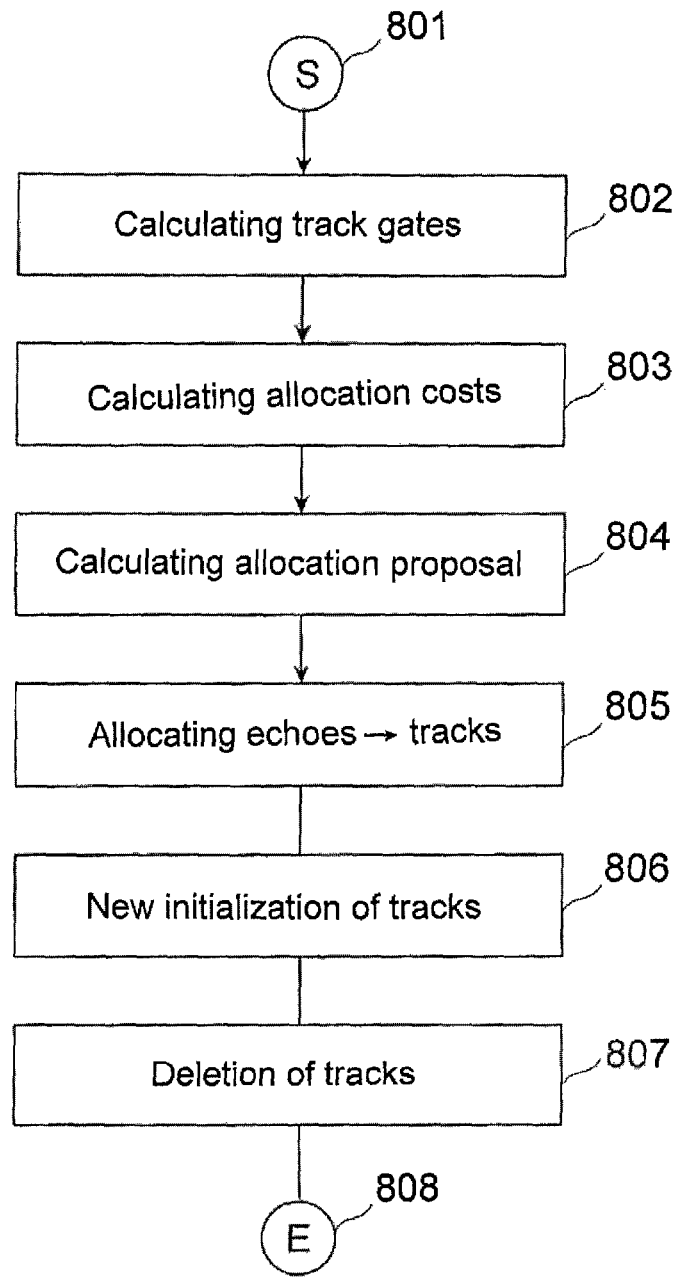
FIG. 8 shows a flow chart of an echo signal evaluation method according to an exemplary embodiment of the invention.

The flow chart in FIG. 8 shows an example of a tracking method according to an exemplary embodiment of the present invention. The method may be implemented, in particular, in an inventive tracking device 602. The tracking method begins in the initial state 801. In step 802, the boundaries of the track gates are initially determined and the costs of the allocation of an echo to a track are calculated for the echoes that lie in the range of the track gate of a track. The costs of an allocation are a measure that indicates how well an echo fits to a track. The costs can be calculated in accordance with conventional methods, wherein large amplitude differences or large differences in location, in particular, may lead to high costs.

WO2009/03700 describes corresponding methods. In step 804, an allocation proposal for the continuation of the tracks with the respective echoes is preferably calculated by means of global cost minimizing algorithms. Disclosures in this respect can also be found in WO2009/03700. In step 805, the echoes are formally transferred into the track list. Steps 806 and 807 serve for newly initializing tracks with non-allocated echoes or the deletion of tracks that can no longer be continued, for example, after a correspondingly long time without allocation. The tracking method ends in step 808.

In the present exemplary embodiment according to FIG. 7, the mobility values of the individual tracks are used for determining gates that are modified in accordance with the invention for the tracks in step 802.

Figure 9:
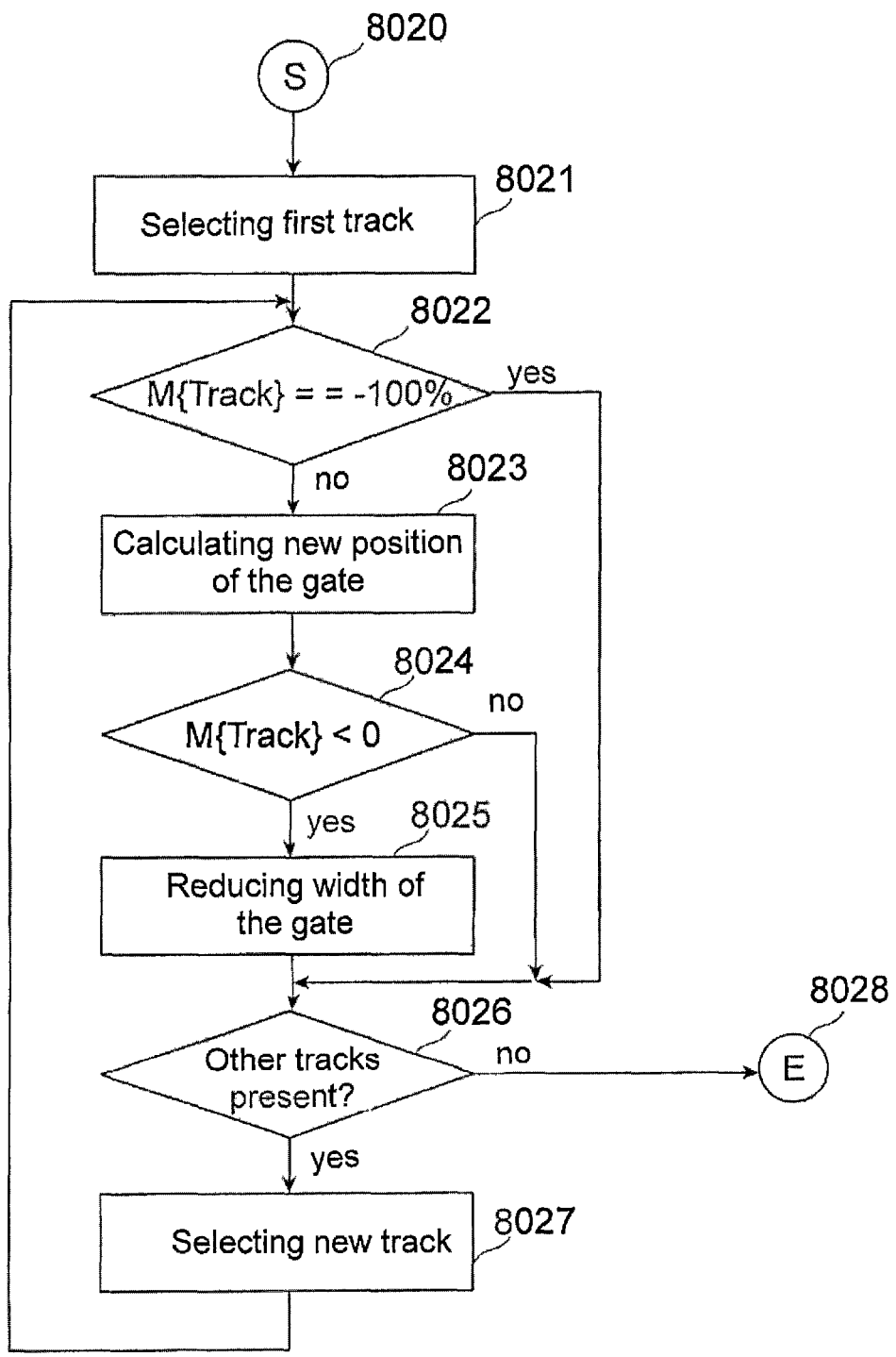
FIG. 9 shows a flow chart of a gating method according to an exemplary embodiment of the invention.

FIG. 9 shows the execution of a gating method according to the present exemplary embodiment in detail.

The method begins in step 8020. In step 8021, the first track of the track list is initially selected. In step 8022, it is now checked whether the track is positively stationary, i.e., whether its mobility is identical to −100%, by utilizing the mobility list made available by the mobility evaluation device 116. If this is the case, the updating of the gates is suspended and the method directly continues with the next track. Otherwise, the new position of the gate is determined in step 8023 with consideration of the parameterized or permanently programmed gate widths. In step 8024, it is checked whether the mobility value of the current track at least indicates stationary tendencies. If this is the case, the width of the gate is subsequently reduced in accordance with the invention in step 8025. The method ends in the final state 8028 once the gates of each track have been calculated.

At this point, it should be noted that the consideration of mobility values in the tracking method by reducing the width of one or more gates merely represents one preferred variation. Various other forms of an inventive utilization of mobility values within a tracking device (602) may also be considered. For example, the calculation of the gates may be realized in a classic fashion, but it needs to be ensured that the mobility values purposefully inhibit individual allocations during the calculation of the allocation costs in step (803). It would also be conceivable to purposefully prevent individual allocations during the determination of the allocation proposal in step 804. It would furthermore be possible that the consideration of mobility values is not implemented until the allocation of echoes to tracks in step (805), namely in such a way that tracks with proven stationarity are only continued with appropriate echoes referred to their location or position.

Figure 10:
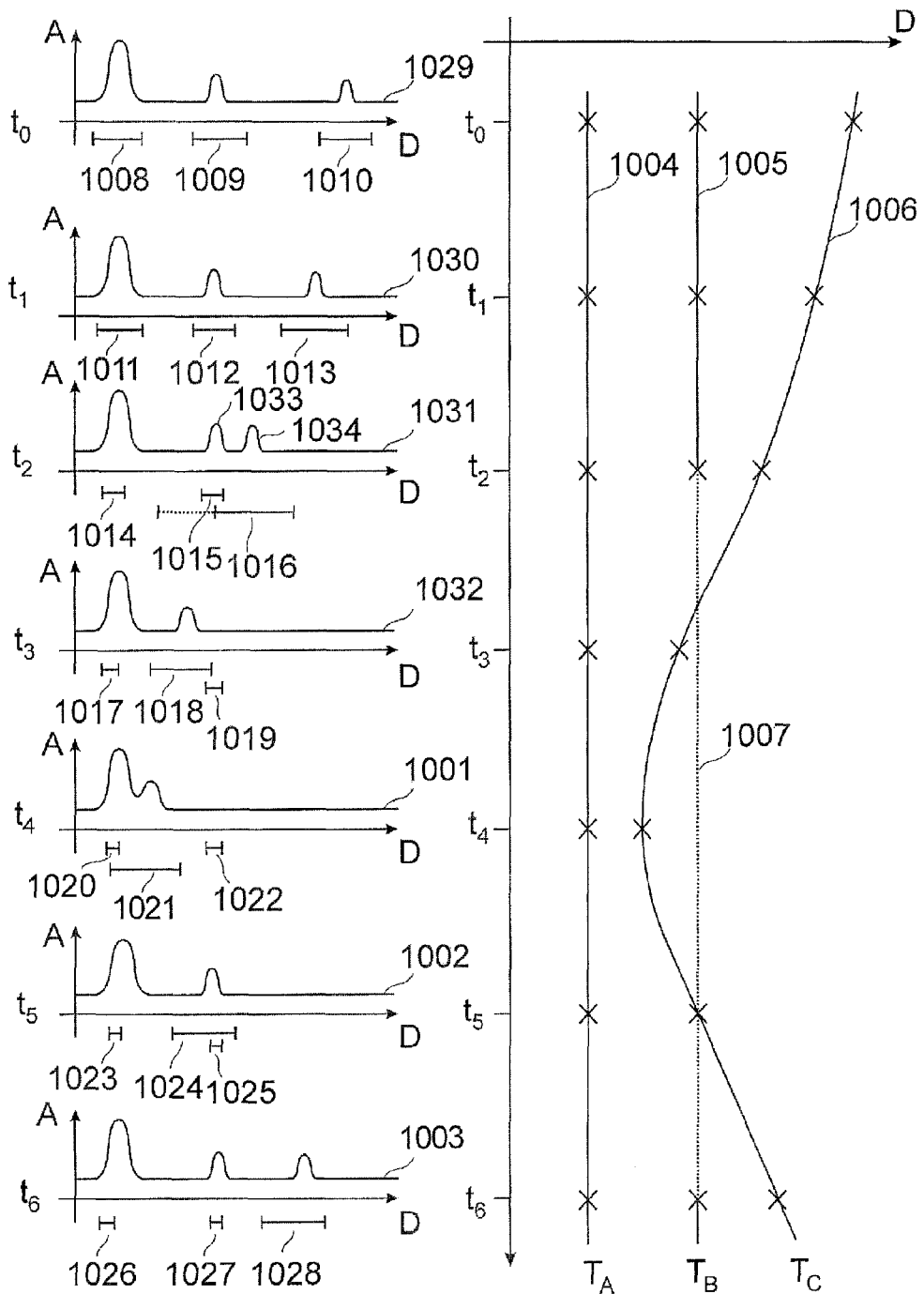
FIG. 10 shows the results of tracking with consideration of mobility according to an exemplary embodiment of the invention.

FIG. 10 shows the inventive course of a tracking method with reference to the example of the curve sequence according to FIG. 3. The echo curves 1029, 1030, 1031, 1032 and 1001 initially show the filling of the container 201. Due to the mobility of the track TC 1006 that is detected with increasing reliability and the stationarity of the tracks TA 1004 and TB 1005, 1007 resulting thereof, the gates of the tracks TA and TB 1008, 1009, 1011, 1012, 1014, 1015, 1017, 1019, 1020, 1022, 1023, 1025, 1026, 1027 are successively reduced with respect to their width, wherein it is practical to not fall short of a minimum width that can be predefined. The gates 1010, 1013, 1016, 1018, 1021, 1024, 1028 of the track TC 1006 that was reliably determined as being mobile remain at their original width over the entire time. Particularly in the measuring cycle at the time t=t3, this results in only the track TC being continuable because the gate 1015 of the track TB reliably inhibits an erroneous allocation. The track TB changes into the invisible state 1007 and is not continued further until the measuring cycle at the time t=t6.

FIG. 10 shows another variation of an inventive method. When two echoes coincide (curve 303), the width or the variance of a gating function or an expectancy function can be increased in the present example if two echoes (1033, 1034) fall short of a predefined minimum distance. The variation illustrated with broken lines indicates the widening of the gate 1016 at the time t=t2 that can be used, in particular, for reliably identifying the product echo while moving through the region of a spurious echo.

Figure 11A:
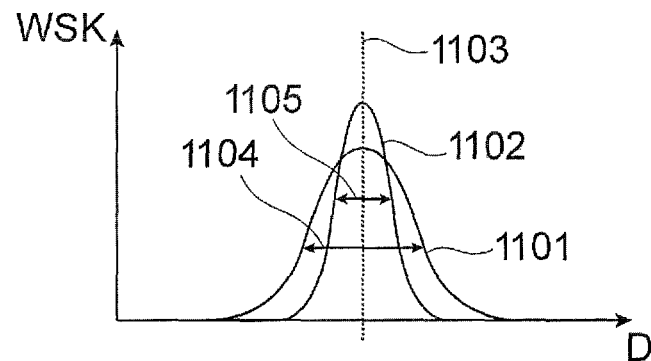
FIG. 11A shows two expectancy functions according to an exemplary embodiment of the invention.

FIG. 11A shows two expectancy functions 1101, 1102 according to an exemplary embodiment of the invention. In this case, the lateral axis 1110 indicates the distance from the product and the vertical axis 1111 indicates the probability of an echo that has a certain distance from the level gauge having to be allocated to a certain track.

The two expectancy functions 1101 and 1102 are, for example, Gauss-shaped and have different widths. The flatter expectancy function 1101 is wider (see arrow 1104) than the somewhat steeper expectancy function 1102 (see arrow 1105).

For example, the value that represents the width of the function at half the height may be used as "width" of the expectancy function.

Figure 11B:
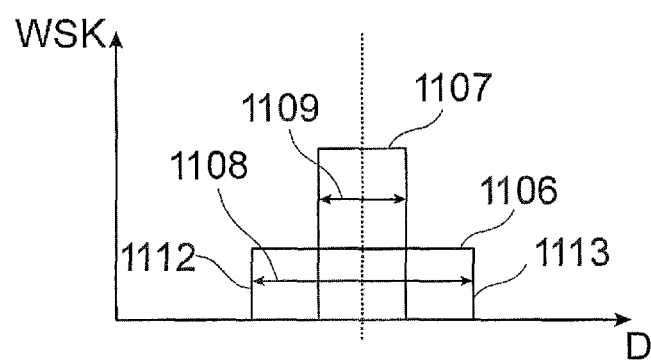
FIG. 11B shows two expectancy functions according to another exemplary embodiment of the invention.

FIG. 11B shows two rectangular expectancy functions 1106, 1107 that are also referred to as window functions.

In this case, the width of the function is synonymous with the distance of the ascending left flank 1112 from the descending right flank 1113.

The rectangular expectancy functions 1106, 1107 may be used, for example, for carrying out a classic or an inventive gating method.

Other expectancy functions 1101, 1102 can be used, for example, for modifying a method for determining the costs for the allocation of echoes to tracks in accordance with the invention.

As a supplement, it should be noted that "comprising" and "featuring" do not exclude any other elements or steps, and that "a" or "an" does not exclude a plurality. It should furthermore be noted that characteristics or steps that were described with reference to one of the above exemplary embodiments can also be used in combination with other characteristics or steps of other above-described exemplary embodiments. Reference numerals in the claims should not be interpreted in a restrictive sense.

The invention claimed is:

1. A level gauge for determining mobility values of echoes of an echo curve and for carrying out a tracking method with consideration of at least one of the mobility values, comprising:
   an calculation unit determining a first mobility value of a first echo of a first echo curve with consideration of a positional shift of the first echo and a positional shift of another echo of the first echo curve,
   wherein the calculation unit is furthermore designed for carrying out a tracking method in order to group echoes of successive echo curves that are caused by the same reflection point,
   wherein the calculation unit allocates a second echo of a second echo curve that is acquired after the first echo curve to a certain track with consideration of at least the first mobility value, and
   wherein the allocation of the second echo to the certain track is realized by utilizing an expectancy function, by means of which a probability for the correct allocation of the second echo to the certain track can be calculated; and wherein a width or a variance of the expectancy function is reduced if the positional shift of the first echo of the first echo curve is zero, but the positional shift of the other echo of the first echo curve is not equal to zero.

2. The level gauge of claim 1, wherein a mobility value of an echo is a parameter for the movement of the echo that is determined with consideration of simultaneously occurring movements or another change of at least one other echo.

3. The level gauge of claim 1, wherein the expectancy function consists of a window function.

4. The level gauge of claim 1, wherein the width or the variance of the expectancy function is increased if the positional shift of the first echo of the first echo curve is not equal to zero.

5. The level gauge of claim 1, wherein the width or the variance of the expectancy function is increased if the second echo falls short of a minimum distance to an adjacent echo of the second echo curve.

6. The level gauge of claim 5, wherein the width or the variance of the expectancy function is increased if the expectancy function overlaps with a corresponding expectancy function of the adjacent echo.

7. The level gauge of claim 1, wherein a mobility value of a second echo is reduced if the positional shift of the first echo of the first echo curve is zero, but the positional shift of the other echo of the first echo curve is not equal to zero.

8. The level gauge of claim 1, wherein the expectancy functions allocated to the echoes of an initial echo curve that is acquired at the beginning of the tracking method and by means of which it is determined whether an echo of a subsequently acquired echo curve needs to be assigned to a certain track have identical widths or variances.

9. The use of a level gauge of claim 1 for interfacial level measurements.

10. A method for determining mobility values of echoes of an echo curve and for carrying out a tracking method with consideration of at least one of the mobility values, comprising:
    using a processor of a level gauge, determining a first mobility value of a first echo of the first echo curve with consideration of a positional shift of the first echo and a positional shift of another echo of the first echo curve,
    using the processor, carrying out a tracking method in order to group echoes of successive echo curves that are caused by identical reflection points; and
    using the processor, allocating a second echo of a second echo curve that is acquired after the first echo curve to a certain track with consideration of at least the first mobility value,
    wherein the allocation of the second echo to the certain track is realized by utilizing an expectancy function, by means of which a probability for the correct allocation of the second echo to the certain track can be calculated; and wherein a width or a variance of the expectancy function is reduced if the positional shift of the first echo of the first echo curve is zero, but the positional shift of the other echo of the first echo curve is not equal to zero.

11. A program element that, when executed on a processor of a level gauge, prompts the processor to carry out the method of claim 10.

12. A machine-readable medium, on which a program element is stored that, when executed on a processor of a level gauge, prompts the processor to carry out the method of claim 10.

* * * * *